United States Patent
Chen

(10) Patent No.: US 8,953,108 B2
(45) Date of Patent: Feb. 10, 2015

(54) STEREOSCOPIC DISPLAY APPARATUS AND LIQUID CRYSTAL LENS

(71) Applicant: Shenzhen China Star Optoelectronics Technology Co., Ltd., Shenzhen, Guangdong (CN)

(72) Inventor: Chih-Wen Chen, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 139 days.

(21) Appl. No.: 13/700,705

(22) PCT Filed: Nov. 15, 2012

(86) PCT No.: PCT/CN2012/084660
§ 371 (c)(1),
(2) Date: Nov. 28, 2012

(87) PCT Pub. No.: WO2014/071644
PCT Pub. Date: May 15, 2014

(65) Prior Publication Data
US 2014/0125891 A1    May 8, 2014

(30) Foreign Application Priority Data
Nov. 6, 2012  (CN) .......................... 2012 1 0438361

(51) Int. Cl.
*G02F 1/1343* (2006.01)
*G02B 27/22* (2006.01)

(52) U.S. Cl.
CPC ................... *G02B 27/2214* (2013.01)
USPC .............. 349/15; 349/110; 349/139; 349/200

(58) Field of Classification Search
CPC . G02B 27/2214; G02F 1/1343; G02F 1/1313; G02F 1/134309; H04N 13/0404; H04N 13/0406
USPC ........... 349/15, 139, 142, 143, 200, 110, 145; 359/462, 463, 464; 348/59
See application file for complete search history.

(56) References Cited

U.S. PATENT DOCUMENTS

| | | | |
|---|---|---|---|
| 2009/0015738 A1 * | 1/2009 | Hong et al. | 349/15 |
| 2012/0120213 A1 * | 5/2012 | Ohyama et al. | 348/60 |
| 2013/0002970 A1 * | 1/2013 | Baek et al. | 349/5 |

* cited by examiner

*Primary Examiner* — Dung Nguyen
*Assistant Examiner* — Tai Duong
(74) *Attorney, Agent, or Firm* — Andrew C. Cheng

(57) ABSTRACT

The present invention discloses a stereoscopic display apparatus. The stereoscopic display apparatus comprises a display panel and a liquid crystal lens. A first electrode layer of the liquid crystal lens comprises a plurality of electrode strips arranged along a first direction and extending in a ladder form along a second direction. The present invention further discloses a liquid crystal lens. According to the present invention method, a plurality of lenticular lens units extend in a ladder form along the second direction are formed in the liquid crystal layer in 3D mode. While the 3D display effect is achieved, the crosstalk between left-eye signals and right-eye signals in 3D mode is effectively suppressed.

14 Claims, 6 Drawing Sheets

STEREOSCOPIC DISPLAY APPARATUS AND LIQUID CRYSTAL LENS

BACKGROUND OF THE INVENTION

1. Field of the Invention

The present invention relates to a liquid crystal display (LCD) technology, more particularly, to a stereoscopic display apparatus and a liquid crystal lens.

2. Description of the Related Art

With the maturity in LCD technology, the stereoscopic display technologies are also vigorously developed. Nowadays, there are two types of stereoscopic display technologies in general, stereoscopic display technology and auto-stereoscopic display technology. A user of a stereoscopic display has to wear special type glasses to see the three-dimensional images. Not only does the user spend money on the special type glasses, but also the user does not feel comfortable when wearing them. The requirement of wearing such special type glasses impedes the widespread utilization of stereoscopic displays. As for a user of an auto-stereoscopic display, he/she can see three-dimension images without the assistance of any extra devices so as to get rid of the requirement of wearing the special type glasses. Hence, auto-stereoscopic displays enjoy more popularity than stereoscopic displays among the users and the sellers.

A commonly seen auto-stereoscopic display utilizes slanted lenticular lenses to realize three-dimensional display. Since the lenticular lenses will not block light from the backlight, the brightness uniformity is improved. A better display effect is thus achieved.

A stereoscopic display having the lenticular lenses utilizes the lenticuar lenses to direct the left-eye image and the right-eye image to the viewer's left eye and the viewer's right eye, respectively. Afterwards, the three-dimensional display effect is achieved. However, the slanted lenticular lenses tend to cause the crosstalk between the left-eye signals and the right-eye signals. Please refer to FIG. 1, FIG. 1 is a schematic diagram showing a structure of an auto-stereoscopic display according to the prior art. In FIG. 1, an auto-stereoscopic display of FIG. 2 is taken as an example. A display screen 101 provides left-eye images 1 and right-eye images 2. When light corresponding to the left-eye images 1 and light corresponding to the right-eye images 2 pass through the lenticular lens 102 having a specific angle 103, the lenticular lens 102 will direct both the left-eye images 1 and the right-eye images 2 to the specific angle 103. Hence, the left-eye images 1 will overlap with the right-eye images 2. As a result, the user will see the left-eye images and the right-eye images 2 simultaneously when viewing from a viewing angle same as the specific angle 103 and cannot see the vivid three-dimension images.

SUMMARY OF THE INVENTION

The present invention provides a stereoscopic display apparatus and a liquid crystal lens to suppress the crosstalk phenomenon of the stereoscopic display apparatus between left-eye signals and right-eye signals in three-dimensional mode (3D mode).

The present invention provides a stereoscopic display apparatus. The stereoscopic display apparatus comprises a display panel and a liquid crystal lens. The display panel comprises a plurality of pixel units arranged in a matrix form along a first direction and a second direction perpendicular to the first direction. The liquid crystal lens is disposed above the plurality of pixel units. The liquid crystal lens comprises a first electrode layer, a second electrode layer, and a liquid crystal layer disposed between the first electrode layer and the second electrode layer. The first electrode layer comprises a plurality of electrode strips arranged along a first direction and extending in a ladder form along a second direction so that a plurality of lenticular lens units extend in a ladder form along the second direction are formed in the liquid crystal layer. The first direction is a row direction of the display panel, and the second direction is a column direction of the display panel. Each of the electrode strips comprises a plurality of first electrode branches and a plurality of second electrode branches, the plurality of first electrode branches extend along the second direction sequentially and arrange along the first direction at regular intervals, each of the plurality of second electrode branches connects with an end of one of the first electrode branches and an adjacent end that is an end of the adjacent first electrode branches.

In one aspect of the present invention, each of the first electrode branches covers N pixel units along the second direction, and N is a first positive integer.

In another aspect of the present invention, the two adjacent first electrode branches are spaced apart by M pixel units along the first direction, and M is a second positive integer.

In another aspect of the present invention, both the first positive integer and the second positive integer are 1.

In still another aspect of the present invention, the second electrode branches extend along the first direction or extend at a slant relative to the first direction.

In yet another aspect of the present invention, the display panel further comprises a black matrix disposed in a region outside of the pixel units, sites of the second electrode branches are corresponding to a site of the black matrix.

The present invention further provides a stereoscopic display apparatus. The present invention provides comprises a display panel and a liquid crystal lens disposed above the plurality of pixel units. The display panel comprises a plurality of pixel units arranged in a matrix form along a first direction and a second direction perpendicular to the first direction. The liquid crystal lens comprises a first electrode layer, a second electrode layer, and a liquid crystal layer disposed between the first electrode layer and the second electrode layer. The first electrode layer comprises a plurality of electrode strips arranged along a first direction and extending in a ladder form along a second direction so that a plurality of lenticular lens units extend in a ladder form along the second direction are formed in the liquid crystal layer.

In one aspect of the present invention, the first direction is a row direction of the display panel, and the second direction is a column direction of the display panel.

In another aspect of the present invention, each of the electrode strips comprises a plurality of first electrode branches and a plurality of second electrode branches, the plurality of first electrode branches extend along the second direction sequentially and arrange along the first direction at regular intervals, each of the plurality of second electrode branches connects with an end of one of the first electrode branches and an adjacent end that is an end of the adjacent first electrode branches.

In another aspect of the present invention, each of the first electrode branches covers N pixel Units along the second direction, and N is a first positive integer.

In another aspect of the present invention, the two adjacent first electrode branches are spaced apart by M pixel units along the first direction, and M is a second positive integer.

In another aspect of the present invention, both the first positive integer and the second positive integer are 1.

In another aspect of the present invention, the second electrode branches extend along the first direction or extend at a slant relative to the first direction.

In another aspect of the present invention, the display panel further comprises a black matrix disposed in a region outside of the pixel units, sites of the second electrode branches are corresponding to a site of the black matrix.

The present invention further provides a liquid crystal lens. The liquid crystal lens comprises a first electrode layer, a second electrode layer disposed opposite to the first electrode layer, and a liquid crystal layer disposed between the first electrode layer and the second electrode layer. The first electrode layer comprises a plurality of electrode strips arranged along a predetermined first direction and extending in a ladder form along a second direction perpendicular to the first direction so that a plurality of ladder-like lenticular lens units are formed in the liquid crystal layer along the second direction.

In one aspect of the present invention, each of the electrode strips comprises a plurality of first electrode branches and a plurality of second electrode branches, the plurality of first electrode branches extend along the second direction sequentially and arrange along the first direction at regular intervals, each of the plurality of second electrode branches connects with an end of one of the first electrode branches and an adjacent end that is an end of the adjacent first electrode branches.

In contrast to the prior art, in the present invention stereoscopic display apparatus, a first electrode layer of the liquid crystal lens comprises a plurality of electrode strips arranged along the first direction and extending in a ladder form along the second direction. When applying driving voltages to the electrode strips, a plurality of lenticular lens units extend in a ladder form along the second direction are formed in the liquid crystal layer. Due to the function of the plurality of ladder-like lenticular lens units, the crosstalk between left-eye signals and right-eye signals in 3D mode is effectively suppressed while the three-dimensional display effect is achieved.

DESCRIPTION OF THE EMBODIMENTS

Figure 1:
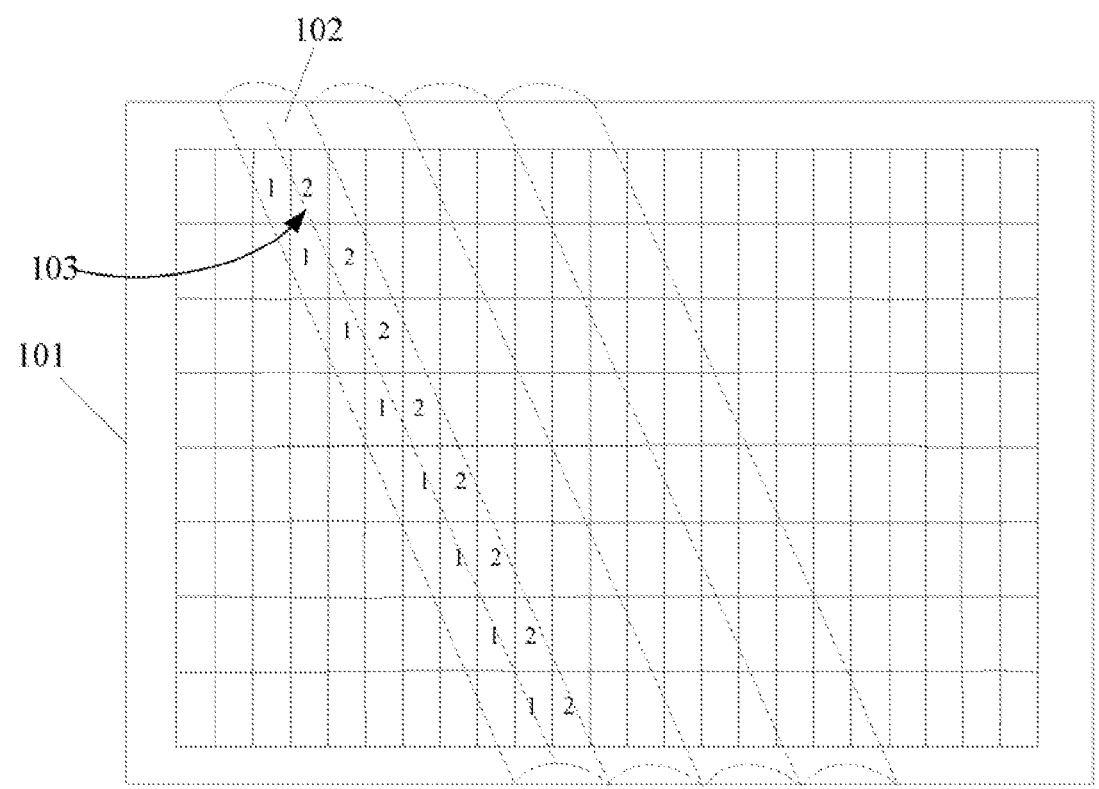
FIG. 1 is a schematic diagram showing a structure of a conventional auto-stereoscopic display.
Figure 2:
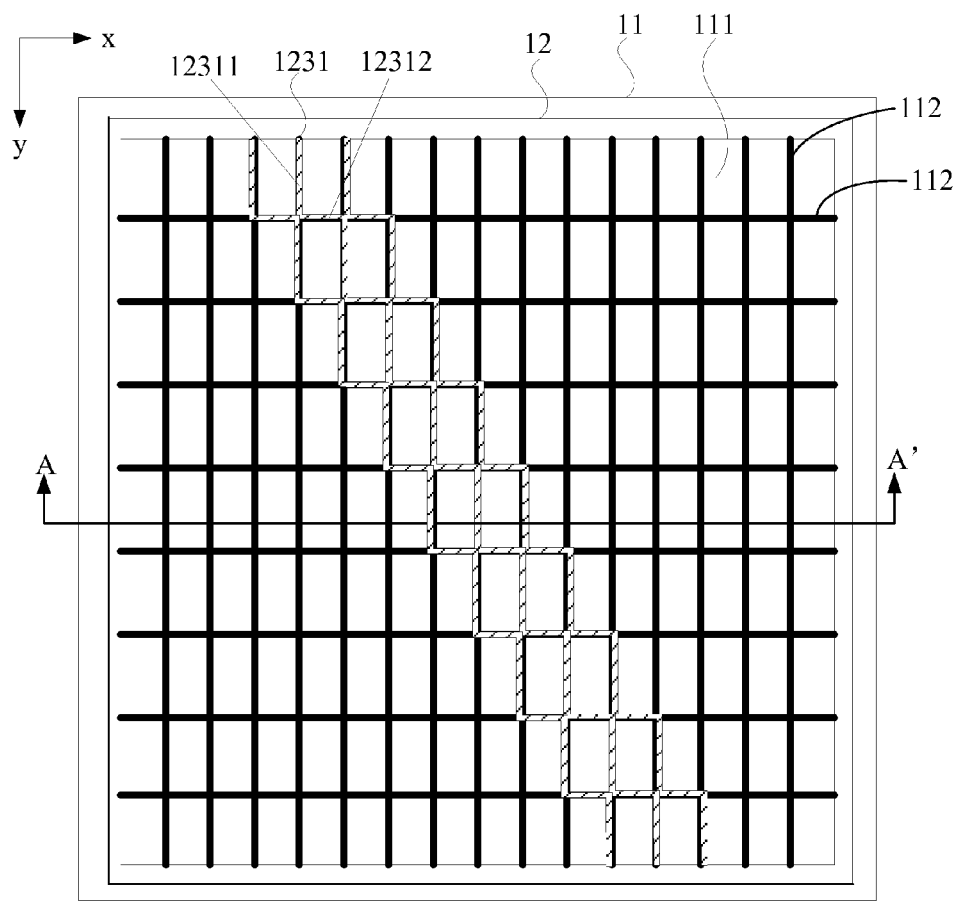
FIG. 2 is a top view of a stereoscopic display apparatus according to an embodiment of the present invention.
Figure 3:
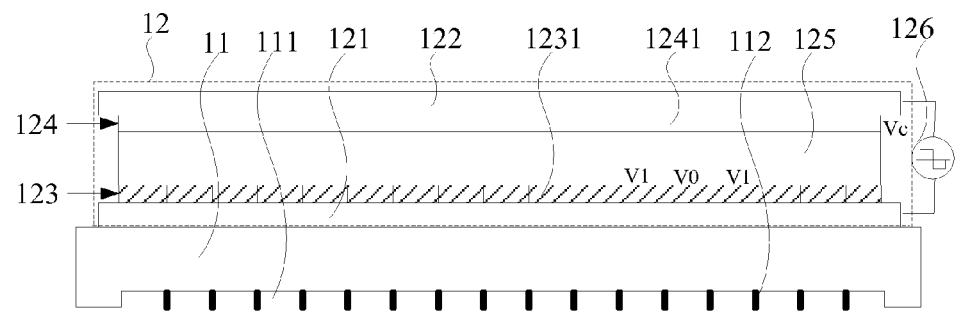
FIG. 3 is a cross-sectional schematic diagram showing the stereoscopic display apparatus of FIG. 2 along line A-A'.

The accompanying drawings and embodiments are included to provide a detailed description of the present invention Please refer to FIG. 2 and FIG. 3. FIG. 2 is a top view of a stereoscopic display apparatus according to an embodiment of the present invention. FIG. 3 is a cross-sectional schematic diagram showing the stereoscopic display apparatus of FIG. 2 along line A-A'. A stereoscopic display apparatus comprises a display panel 11 and a liquid crystal lens 12. The display panel 11 comprises a plurality of pixel units arranged in a matrix form along a first direction x and a second direction y perpendicular to the first direction x. In the preferred embodiment, the first direction x is a row direction of the display panel 11, the second direction y is a column direction of the display panel 11. The liquid crystal lens 12 is disposed on the side of a display surface of the display panel 11 and above the plurality of pixel units 111 to allow light emitted from the display panel 11 passing through the liquid crystal lens 12. The liquid crystal lens 12 comprises a first substrate 121, a second substrate 122 disposed opposite to the first substrate 121, a first electrode layer 123, and a second electrode layer 124 disposed opposite to the first electrode layer 123. The first electrode layer 123 is disposed on the side of the first substrate 121 facing the second substrate 122, while the second electrode layer 124 is disposed on the side of the second substrate 122 facing the first substrate 121. The liquid crystal lens 12 further comprises a liquid crystal layer 125 disposed between the first electrode layer 123 and the second electrode layer 124.

The second electrode layer 124 comprises a common electrode 1241. The first electrode layer 123 comprises a plurality of electrode strips 1231 arranged along the first direction x and presenting a ladder form along the second direction y (in FIG. 2 only portions of the electrode strips 1231 are illustrated). Specifically, each of the electrode strips 1231 comprises a plurality of first electrode branches 12311 and a plurality of second electrode branches 12312. The plurality first electrode branches 12311 extend along the second direction y sequentially, and arrange along the first direction x at regular intervals. Each of the plurality of second electrode branches 12312 connects with an end of one of the first electrode branches 12311 and an adjacent end that is an end of the adjacent first electrode branches 12311. The plurality of second electrode branches 12312 extend along the first direction x. In each of the plurality of electrode strips 1231, each of the first electrode branches 12311 covers N pixel unit(s) 111 along the second direction y, and the two adjacent first electrode branches 12311 are spaced apart by M pixel unit(s) 111 along the first direction x. N is a first positive integer and M is a second positive integer.

In the present embodiment, the first positive integer and the second positive integer are both 1. That means, each of the first electrode branches 12311 covers one of the pixel units 111 along the second direction y, and the two adjacent first electrode branches 12311 are spaced apart by one of the pixel units 111 along the first direction x. The display panel 11 further comprises a black matrix 112 disposed in a region outside of the pixel units 111. Sites of the first electrode branches 12311 are corresponding to a site of the black matrix 112 between columns of the pixel units 111. Sites of the second electrode branches 12312 are corresponding to the site of the black matrix 112 between rows of the pixel units 111. Therefore, the aperture ratio of the stereoscopic display apparatus is increased to a certain extent.

Figure 4:
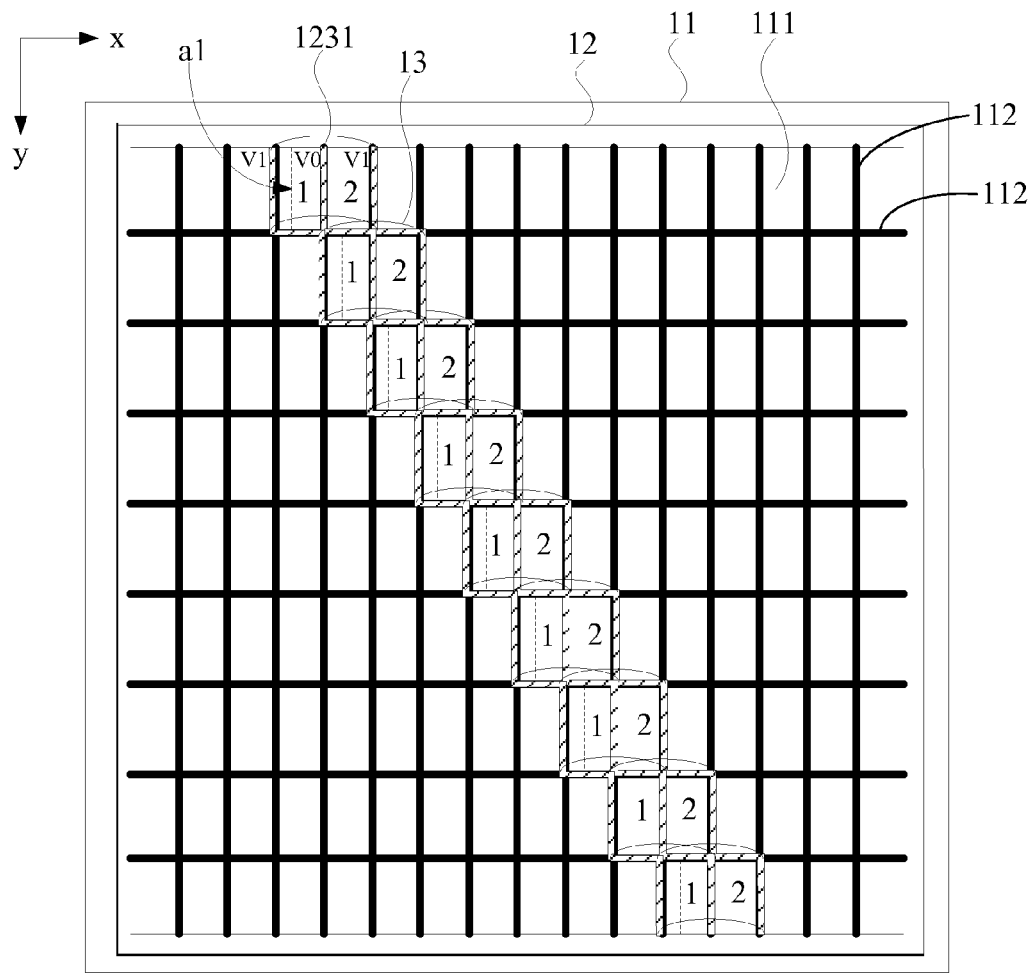
FIG. 4 is a schematic diagram showing a plurality of lenticular lens units formed in the stereoscopic display apparatus of FIG. 2 in 3D mode.

By applying driving voltages to the electrode strips 1231 having the ladder-like structure in 3D mode, a plurality of lenticular lens units 13 presenting a ladder form along the second direction y, as shown in FIG. 4, are formed in the liquid crystal layer 125. The plurality of lenticular lens units 13 will achieve the three-dimensional display effect. At the same time, the crosstalk phenomenon between the left-eye signals and the right-eye signals in 3D mode is suppressed to provide the viewer with more vivid three-dimensional images.

Specifically, please also refer to FIG. 4, a voltage supply 126 applies a common voltage Vc to the common electrode 1241 on the second electrode layer 124 and the driving voltages required by three-dimensional display to two adjacent electrode strips 1231 in 3D mode. Preferably, the driving voltage applied to one of the electrode strips 1231 is different from that applied to the adjacent electrode strip 1231. Hence, the voltage difference between one of the electrode strips 1231 and the common electrode 1241 is different from the voltage difference between the adjacent electrode strip 1231 and the common electrode 1241. For example, as shown in FIG. 3 and FIG. 4, for the three sequentially arranged electrode strips 1231, the driving voltage V0 applied to the center electrode strip 1231 is smaller than the driving voltage V1 applied to the adjacent electrode strips 1231, both on the left side and right side of the center electrode strip 1231. The voltage difference between the common electrode 1241 and the center electrode strip 1231 is thus smaller than the voltage difference between the common electrode 1241 and the electrode strips 1231 on the left side and right side of the center electrode strip 1231. As a result, a symmetric electric field centered on the center electrode strip 1231 and edged at the electrode strips 1231 on the left and right sides of the center electrode strip 1231 is generated in the liquid crystal layer 125. Under the influence of the electric field, liquid crystal molecules in the liquid crystal layer 125 will align along a direction of the electric field to form the plurality of lenticular lens units 13 in the liquid crystal layer 125 shown in FIG. 4. Since the electrode strip 1231 in a ladder form extends along the second direction y, the plurality of lenticular lens units 13 also extend in a ladder form along the second direction y.

The plurality of pixel units 111 of the display panel 11 alternatively display an image 1 and an image 2 along the first direction x, and an interval between the two same and neighboring images along, the second direction y is one pixel unit 111. When the light corresponding to the image 1 and the light corresponding to the image 2 pass through the lenticular lens unit 13, the lenticular lens unit 13 will deliver the left-eye image to the left eye and the right-eye image to the right eye. The viewer is thus allowed to see three-dimensional images without wearing glasses. As a result, three-dimensional display is realized. Given the fact that the plurality of lenticular lens units 13 extend in a ladder form along the second direction y. Each of the lenticular lens units 13 covers two pixel units 111 corresponding to the image 1 and the image 2 along the first direction x. In addition, an interval between the two neighboring lenticular lens units 13 along the second direction y is one pixel unit 111. The same images corresponding to the different pixel units 111 will correspond to the same portions of the lenticular lens units 13. For example, each of the image 1 along the second direction y will correspond to the same portion a1 of the corresponding lenticular lens unit 13 so that the portion a1 will only deliver the image 1 and not the image 2. It should be understood that, for a plurality of lenticular lens units 13 having the same angle of emergence, only the same images are delivered rather than two different images. Consequently, the crosstalk between the left-eye image and the right-eye image in 3D mode is suppressed to achieve a better three-dimensional display effect.

Figure 5:
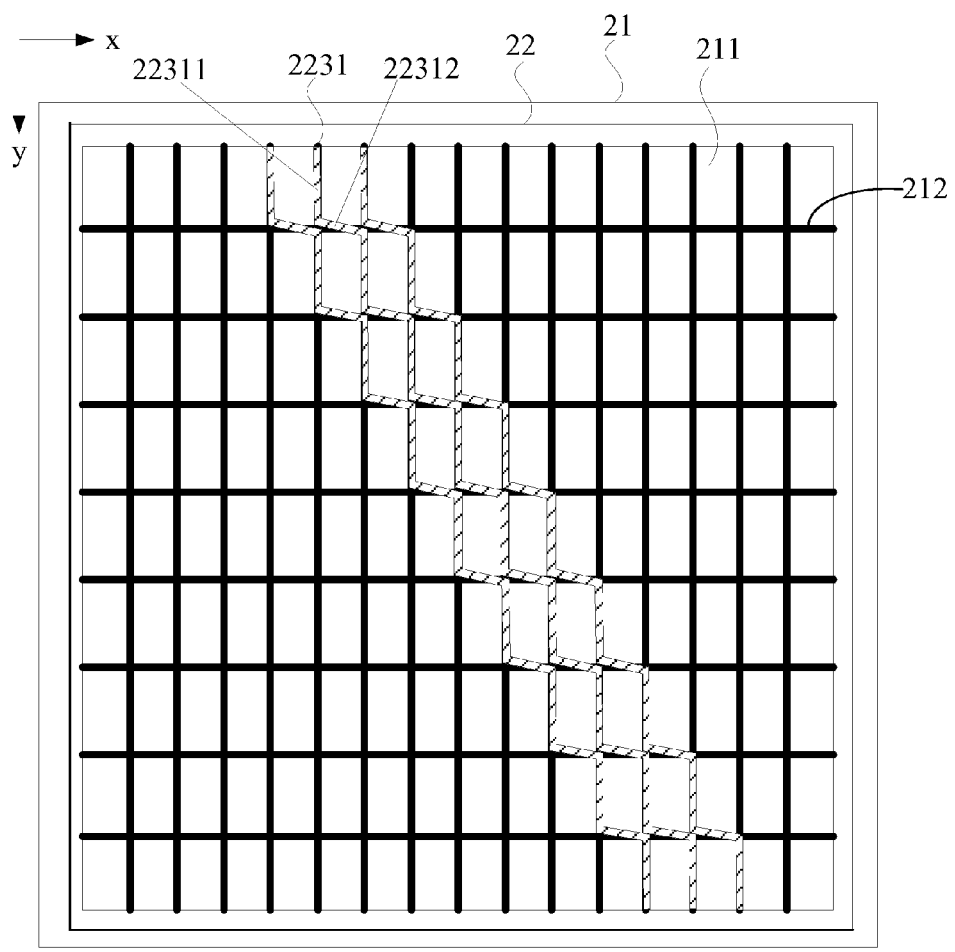
FIG. 5 is a top view of a stereoscopic display apparatus according to another embodiment of the present invention.
Figure 6:
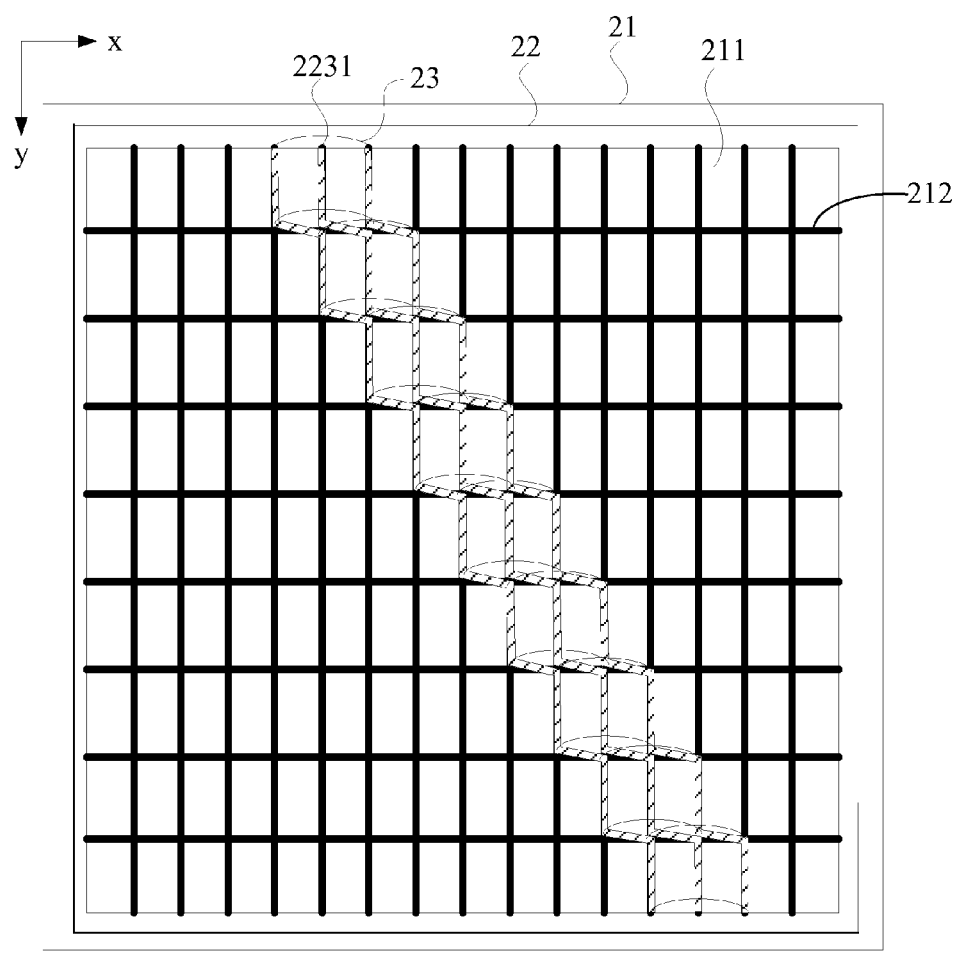
FIG. 6 is a schematic diagram showing a plurality of lenticular lens units formed in the stereoscopic display apparatus of FIG. 5 in 3D mode.

It is worth noting that in the present embodiment the second electrode branch 12312 of the electrode strip 1231 extends along the first direction x. Please refer to FIG. 5 in another embodiment, liquid crystal lens 22 is disposed above a plurality of pixel units 211 of a display panel 21. Second electrode branches 22312 of electrode strips 2231 in the liquid crystal lens 22 extend at a slant relative to the first direction x, and first electrode branches 22311 extend along the second direction y. Preferably, the second electrode branch 22312 has a less than ten degree slant relative to the first direction x. Sites of the second electrode branches 22312 are corresponding to a site of a black matrix 212 disposed in a region outside of the pixel units 211. Since the sites of the second electrode branches 22312 are corresponding to the site of the black matrix 212, the slant of the second electrode branches 22312 relative to the first direction x will not significantly affect the display effect. By applying driving voltages to the plurality of electrode strips 2231, a plurality of lenticular lens units 23 presenting a ladder form are formed along the second direction y, as shown in FIG. 6. Consequently, the crosstalk phenomenon between the left-eye image and the right-eye image in 3D mode is effectively suppressed. The driving method may be referred to the previous embodiment and there is no need to elaborate on it redundantly.

In order to better understand the present invention, a stereoscopic display apparatus according to a further embodiment of the present invention is provided. Please refer to FIG. 7, a stereoscopic display apparatus comprises a display panel 31 and a liquid crystal lens 32. The major difference between the present embodiment and the previous embodiments is in that each first electrode branch 32311 of each electrode strip 3231 covers two pixel units 311 of the display panel 31 along the second direction y, and the two adjacent first electrode branches 32311 are still spaced apart by one of the pixel units 311 along the first direction x. The two adjacent electrode strips 3231 are spaced apart by two of the pixel units 311 (relative to the first electrode branch 32311) along the first direction x.

Figure 7:
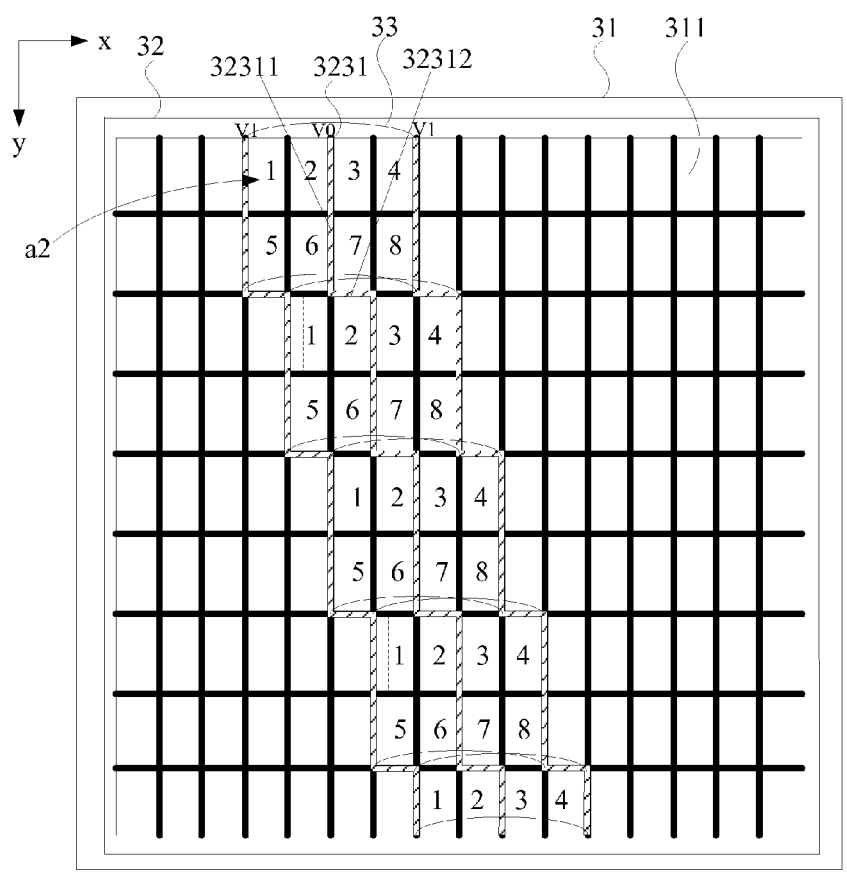
FIG. 7 is a top view of a stereoscopic display apparatus according to a further embodiment of the present invention.

In 3D mode, the above-mentioned driving method is employed to drive the liquid crystal lens. The driving voltage applied to one of the electrode strips 3231 is different from that applied to the adjacent electrode strip 3231. Hence, the voltage difference between one of the electrode strips 3231 and the common electrode is different from the voltage difference between the adjacent electrode strip 3231 and the common electrode. As a result, a plurality of lenticular lens units 33 are formed in a liquid crystal layer as shown in FIG. 7. The plurality of lenticular lens units 13 extend in a ladder form along the second direction y. Each of the lenticular lens units 33 covers four pixel units 311 along the first direction x and two pixel units 311 along the second direction y. Each of the two adjacent rows of pixel units 311 alternatively displays four images along the first direction x, that is, image 1 to image 4 and image 5 to image 8. An interval between the same images along the second direction is one pixel unit 311. Since the plurality of lenticular lens units 33 presents a ladder form along the second direction y and an interval between the two neighboring lenticular lens units 33 along the second direction y is one pixel unit 311, the same images corresponding to the different pixel units 311 will correspond to the same portions of the lenticular lens units 33. For example, each of the image 1 along the second direction y will correspond to the same portion a2 of the corresponding lenticular lens unit 33 so that the portion a2 will only deliver the image 1 rather than any other images. In other words, the portions a2 of all of the lenticular lens units 33 will deliver the same images. Consequently. the crosstalk between the left-eye image and the right-eye image is effectively suppressed.

The present invention further provides a liquid crystal lens. According to an embodiment of the present invention, the liquid crystal lens comprises a first electrode layer, a second electrode layer disposed opposite to the first electrode layer, and a liquid crystal layer disposed between the first electrode layer and the second electrode layer The first electrode layer comprises a plurality of electrode strips arranged along a predetermined first direction and extending in a ladder form along a second direction perpendicular to the first direction so that a plurality of ladder-like lenticular lens units are firmed in the liquid crystal layer along the second direction.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal lens comprising a first electrode layer, a second electrode layer disposed opposite to the first electrode layer, and a liquid crystal layer disposed between the first electrode layer and the second electrode layer, the first electrode layer comprising a plurality of electrode strips arranged along a predetermined first direction and extending in a ladder form along a second direction perpendicular to the first direction so that a plurality of ladder-like lenticular lens units are formed in the liquid crystal layer along the second direction,
wherein each of the electrode strips comprises a plurality of first electrode branches and a plurality of second electrode branches, the plurality of first electrode branches extend along the second direction sequentially and arrange alone the first direction at regular intervals, each of the plurality of second electrode branches connects with an end of one of the first electrode branches and an adjacent end that is an end of the adjacent first electrode branches.

2. A stereoscopic display apparatus, comprising:
a display panel comprising a plurality of pixel units arranged in a matrix form along a first direction and a second direction perpendicular to the first direction;
a liquid crystal lens disposed above the plurality of pixel units, the liquid crystal lens comprising a first electrode layer, a second electrode layer, and a liquid crystal layer disposed between the first electrode layer and the second electrode layer, the first electrode layer comprising a plurality of electrode strips arranged along a first direction and extending in a ladder form along a second direction so that a plurality of lenticular lens units extend in a ladder form along the second direction are formed in the liquid crystal layer;
wherein the first direction is a row direction of the display panel, and the second direction is a column direction of the display panel;
each of the electrode strips comprises a plurality of first electrode branches and a plurality of second electrode branches, the plurality of first electrode branches extend along the second direction sequentially and arrange along the first direction at regular intervals, each of the plurality of second electrode branches connects with an end of one of the first electrode branches and an adjacent end that is an end of the adjacent first electrode branches.

3. The stereoscopic display apparatus as claimed in claim 2, wherein each of the first electrode branches covers N pixel units along the second direction, and N is a first positive integer.

4. The stereoscopic display apparatus as claimed in claim 3, wherein the two adjacent first electrode branches are spaced apart by M pixel units along the first direction, and M is a second positive integer.

5. The stereoscopic display apparatus as claimed in claim 4, wherein both the first positive integer and the second positive integer are 1.

6. The stereoscopic display apparatus as claimed in claim 2, wherein the second electrode branches extend along the first direction or extend at a slant relative to the first direction.

7. The stereoscopic display apparatus as claimed in claim 2, wherein the display panel further comprises a black matrix disposed in a region outside the pixel units, sites of the second electrode branches are corresponding to a site of the black matrix.

8. A stereoscopic display apparatus, comprising:
a display panel comprising a plurality of pixel units arranged in a matrix form along a first direction and a second direction perpendicular to the first direction; and
a liquid crystal lens disposed above the plurality of pixel units, the liquid crystal lens comprising a first electrode layer, a second electrode layer, and a liquid crystal layer disposed between the first electrode layer and the second electrode layer, the first electrode layer comprising a plurality of electrode strips arranged along a first direction and extending in a ladder form along a second direction so that a plurality of lenticular lens units extend in a ladder form along the second direction are formed in the liquid crystal layer;
wherein each of the electrode strips comprises a plurality of first electrode branches and a plurality of second electrode branches, the plurality of first electrode branches extend along the second direction sequentially and arrange alone the first direction at regular intervals each of the plurality of second electrode branches connects with an end of one of the first electrode branches and an adjacent end that is an end of the adjacent first electrode branches.

9. The stereoscopic display apparatus as claimed in claim 8, wherein the first direction is a row direction of the display panel, and the second direction is a column direction of the display panel.

10. The stereoscopic display apparatus as claimed in claim 8, wherein each of the first electrode branches covers N pixel units along the second direction, and N is a first positive integer.

11. The stereoscopic display apparatus as claimed in claim 10, wherein the two adjacent first electrode branches are spaced apart by M pixel units along the first direction, and M is a second positive integer.

12. The stereoscopic display apparatus as claimed in claim 11, wherein both the first positive integer and the second positive integer are 1.

13. The stereoscopic display apparatus as claimed in claim 8, wherein the second electrode branches extend along the first direction or extend at a slant relative to the first direction.

14. The stereoscopic display apparatus as claimed in claim 8, wherein the display panel further comprises a black matrix disposed in a region outside the pixel units, sites of the second electrode branches are corresponding to a site of the black matrix.

* * * * *